United States Patent [19] [11] Patent Number: 4,756,546
Kubo et al. [45] Date of Patent: Jul. 12, 1988

[54] REAR WHEEL SUSPENSION DEVICE FOR FRONT AND REAR WHEEL STEERING VEHICLE

[75] Inventors: Kanji Kubo; Kenichi Ohno, both of Wako, Japan

[73] Assignee: Honda Giken Kogyo Kabushiki Kaisha, Saitama, Japan

[21] Appl. No.: 25,587

[22] Filed: Mar. 13, 1987

[51] Int. Cl.$^4$ .............................. B62D 17/00
[52] U.S. Cl. ...................... 280/661; 280/91; 280/675
[58] Field of Search .................. 280/91, 661, 675

[56] References Cited

U.S. PATENT DOCUMENTS 4,613,144 9/1986 Furukawa .............................. 280/91

FOREIGN PATENT DOCUMENTS 1007618 10/1965 United Kingdom ................ 280/675

Primary Examiner—Kenneth R. Rice
Attorney, Agent, or Firm—Stevens, Davis, Miller & Mosher

[57] ABSTRACT

Disclosed is a rear wheel suspension device for a front and rear wheel steering vehicle wherein rear wheels are steered in an opposite phase relationship relative to the front wheels at least under a certain condition. The structure of the suspension for the rear wheels is so determined that a caster angle of each of the rear wheels relatively sharply increases as the distance between the vehicle body and the rear wheel is increased from a neutral state and maintains a smaller positive value as the distance between the vehicle body and the rear wheel is decreased from the neutral state. This can be accomplished by pivotably connecting the knuckle for each of the rear wheels by an upper arm and a lower arm to the vehicle body, respectively, and a rotational axial line of the upper arm inclines downward at its forward portion while the rotational axial line of the lower arm extends substantially parallel to the length of the vehicle. Preferably, the rotational axial line of the upper arm additionally inclines inward at its forward portion. Thus, the force required to maintain a certain steering angle changes smoothly as the steering angle is increased and at the same time the tendency of the rear wheels to take a straight course is maintained.

5 Claims, 3 Drawing Sheets

REAR WHEEL SUSPENSION DEVICE FOR FRONT AND REAR WHEEL STEERING VEHICLE

BACKGROUND OF THE INVENTION

This invention relates to a rear wheel suspension device for a front and rear wheel steering vehicle and in particular to a rear wheel suspension device of this type which is capable of reducing the changes in the actuating force required to maintain a certain steering angle of the rear wheels.

PRIOR ART

Various rear and front wheel systems have been proposed. For instance, copending U.S. patent application Nos. 822,000, 822,293, 821,998, 822,008, 822,010 and 822,043 claiming Convention priority based on the original Japanese filing date of Jan. 24, 1985 disclose steering devices for vehicles which allow the rear wheels to be steered in correspondence with the steering of the front wheels in accordance with vehicle speed. According to these devices, the rear wheels are generally steered in the same phase relationship, or none at all, in a high speed range and are steered in the opposite phase relationship in a low speed range. The steering angle ratio is, for instance, a continuous function of the vehicle speed, with the steering angle ratio assuming a positive value or a same-phase relationship when the vehicle speed is greater than a certain value and assuming a negative value or an opposite phase relationship when the vehicle speed is lower than that value, whereby the behavior of the vehicle in all speed ranges can be improved. For instance, in the low speed range, because the rear wheels are steered in the opposite phase relationship, the minimum angle of turning and the inner radius difference between the inner and outer wheels (the degree of difference between the paths of the inner and the outer wheels) are both drastically reduced and the maneuverability of the vehicle, when driving it into a garage or through narrow and tortuous alleyways, or when making a U-turn, is substantially improved. In the high speed range, the dynamic lateral responses of the vehicle, for instance when changing driving lanes, are much improved.

According to U.S. Pat. No. 4,295,657 assigned to the same assignee, the rear wheels are steered in the opposite phase relationship when the steering angle is small and in the same phase relationship when the steering angle is great. This structure simplifies the steering mechanism for the rear wheels and can yet achieve substantially the same effect as the previously mentioned front and rear wheel steering systems.

In such a vehicle, since the phase relationship of the rear wheels relative to the front wheels changes depending on the steering angle of the steering wheel, the force required to hold the steering angle of the rear wheels changes as the steering angle is changed and this could cause the driver some discomfort. Most cars are equipped with hydraulic power steering devices but in most cases the reaction which the wheels experience from the road surface is permitted to be transmitted back to the steering wheel to improve the useability of the steering device, in particular by permitting the self-aligning torque of the steered wheels or, in other words, the torque which tends to bring the steered wheels back to their neutral positions, to assist the driver in performing a steering operation.

The changes in the force required to hold the steering wheel at a certain steered angle (referred to as steering torque hereinafter) become more pronounced as the caster angle of each of the rear wheels is increased and the magnitude of the self-aligning torque is increased. However, if the caster angles of the rear wheels are reduced to reduce the fluctuation in the steering torque, the capability of the rear wheels to maintain a straight course may be impaired.

BRIEF SUMMARY OF THE INVENTION

In view of such problems of the prior art, a primary object of this invention is to provide a rear wheel suspension device for a front and rear wheel steering vehicle in which fluctuation of the force required to maintain the steering wheel at a certain steered angle (steering torque) is reduced and at the same time the tendency of the rear wheels to maintain a straight course is assured.

Another object of the present invention is to provide a rear wheel suspension device for a front and rear wheel steering vehicle which minimizes the fluctuation of the steering torque with a simple structure.

According to this invention, such objects are accomplished by providing a rear wheel suspension device for a front and rear wheel steering vehicle wherein rear wheels are steered in an opposite phase relationship relative to the front wheels at least under a certain condition, characterized by that: the caster angle of each of the rear wheels relatively sharply increases as the distance between the vehicle body and the rear wheel is increased from a neutral state, and maintains a smaller positive value as the distance between the vehicle body and the rear wheel is decreased from that neutral state.

Thus, when the vehicle makes a sharp turn causing the vehicle body, in particular the outer part thereof, to sink and come closer to the outer wheel by virtue of a centrifugal force acting on the gravitational center of the vehicle body and the caster angle of the outer rear wheel is thereby reduced, the self aligning torque is advantageously reduced because the outer rear wheel which is subjected to a greater vertical load during the turning action of the vehicle accounts for a significantly larger part of the self-aligning torque than the inner rear wheel. On the other hand, when the vehicle is cruising or decelerating, since the vehicle body maintains a certain vertical distance away from the rear wheels and the caster angles of the rear wheels are thereby increased, the rear wheels advantageously produce a relatively strong tendency to maintain a straight course. Thus, the force required to maintain a certain steering angle changes smoothly as the steering angle is increased and at the same time the tendency of the rear wheels to take a straight course is maintained.

According to a certain aspect of the present invention, such a coster angle property of the rear wheels is produced by a structure in which a knuckle for each of the rear wheels is supported by an upper arm and a lower arm which pivotably connect the knuckle to the vehicle body at their respective two ends, respectively, and a rotational axial line of the upper arm inclines downward at its forward portion while the rotational axial line of the lower arm extends substantially parallel to the length of the vehicle. Preferably, the axial line of the upper arm additionally inclines inward at its forward portion.

This structure is advantageous not only because of its simplicity but also its capability to reduce the tendency of the rear part of the vehicle body to sink when a sudden braking action is taken.

BRIEF DESCRIPTION OF THE DRAWINGS

Now an embodiment of this invention will be described in the following with reference to the appended drawings, in which.

DETAILED DESCRIPTION OF THE PREFERRED EMBODIMENT

Figure 1:
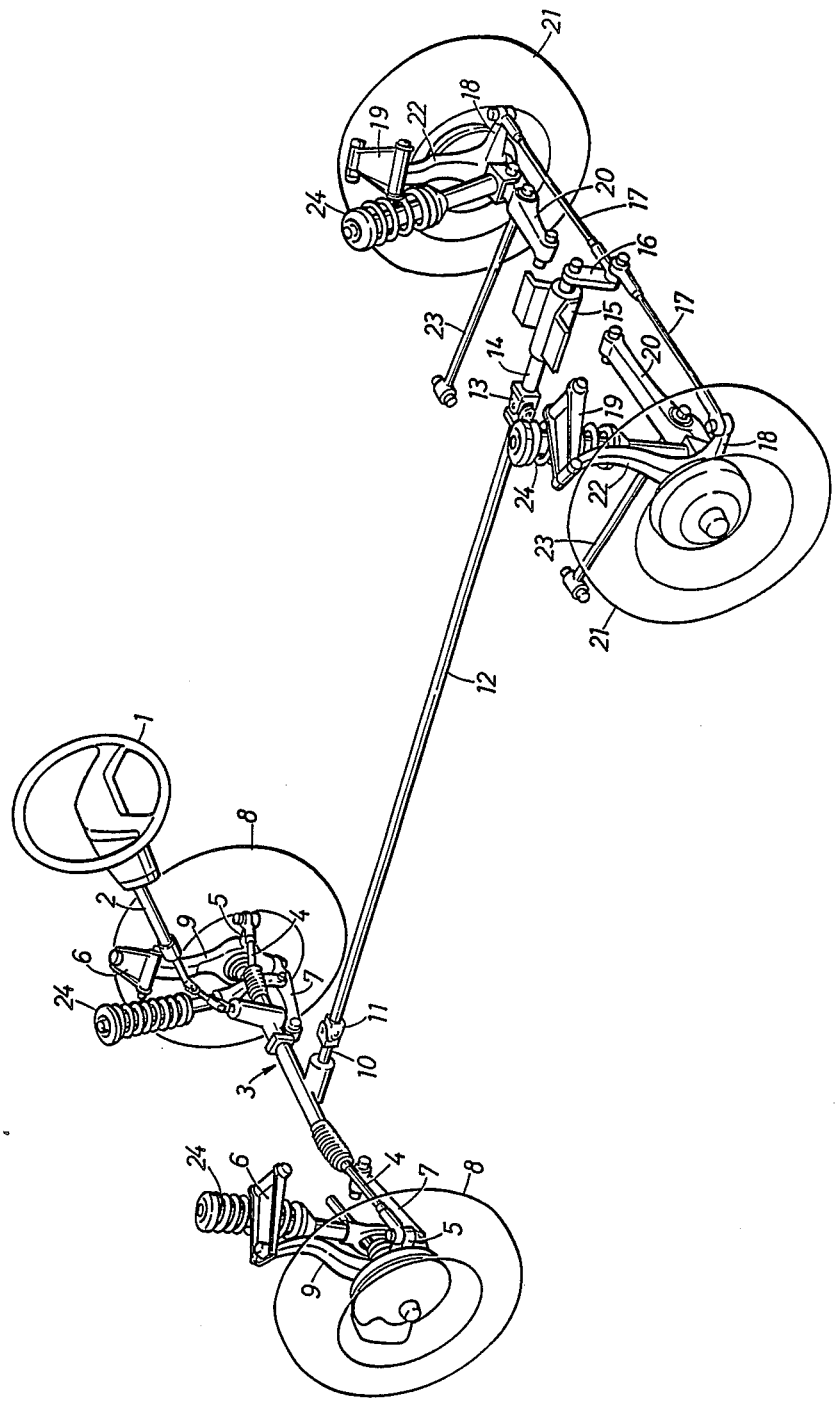
FIG. 1 is a perspective view showing the suspension system and the steering system of a vehicle to which the rear wheel suspension device of the present invention is applied.

FIG. 1 generally shows the suspension system and the steering system of a front and rear wheel steering vehicle to which an embodiment of the rear wheel steering device of the present invention is applied. A steering shaft 2 which is connected to the steering wheel 1 of this vehicle is joined to a gear box 3 of a rack and pinion type at it lower end, and the two ends of a rack gear not shown in the drawings are connected to the inner ends of tie rods 4 by way of ball joints. The other ends or the external ends of the tie rods 4 are connected to knuckle arms 5 for the respective front wheels 8. The knuckle arms 5 integrally project from knuckles 9 which support the front wheels 8 and are in turn supported at their upper and lower ends by upper arms 6 and lower arms 7, respectively, each of which are pivotally connected to the vehicle body at their other ends.

A pinion shaft 10 extends rearward from the gear box 3, and the rear end of the pinion shaft 10 is connected, by way of a universal joint 11, to a connecting shaft 12 which extends all the way to the steering device for the rear wheels. The pinion shaft 10 is provided with a pinion (not shown in the drawings) which meshes with the rack gear incorporated in the gear box 3 and is turned at a certain gear ratio as the steering wheel 1 is turned.

The steering device for the rear wheels 21 comprises an input shaft 14 which is connected to the rear end of the connecting shaft 12 by way of a universal joint 13 and is secured to the vehicle body by way of a bearing bracket 15 fixedly attached to a rear part of the vehicle body. The rear end of the input shaft 15 which projects rearward is connected to a crank member 16 having a radially extending arm 16a. The radially external end of the arm 16a of the crank member 16 is connected to the internal ends of a pair of tie rods 17 by way of ball joints. The external ends of the tie rods 17 are connected to knuckle arms 18 of the knuckles 22 for the rear wheels 21. The knuckles 22 are supported by upper arms 19 and lower arms 20 at their upper and lower ends, respectively. These arms 19 and 20 are pivotally connected to the vehicle body at their internal ends in a manner similar to the corresponding parts for the front wheels. The lower arms 20 are also connected to radius rods 23 at their intermediate portions for added rigidity of the lower arms 20 against the reactions which the rear wheels 21 experience in relation to the road surface.

The knuckles 9 and 22 are supported by suspension systems 24 each of which comprises a coil spring and an oil damper.

Thus, as the steering wheel 1 is turned, the front wheels 8 are steered by virtue of the steering force transmitted thereto by way of the internal mechanism of the gear box 3 and the tie rods 4 of the front wheels 8. At the same time, the steering torque of the steering wheel 1 is also transmitted to the pinion shaft 10 and is further transmitted to the connecting shaft 12 and the input shaft 14. As the input shaft 14 is rotated, the crank member 16 is rotated and the rear wheels 21 are steered by way of the tie rods 17.

According to the present embodiment, the crank member 16 is fixedly attached to the input shaft 14 in such a manner that the arm 16a depends vertically downwards when the front wheels 8 are in their neutral positions. At this time, the rear wheels 21 are also in their neutral positions. Therefore, when the steering angle is small and the motion of the arm 16a of the crank member 16 is limited to the range below the horizontal plane which contains the axial line of the input shaft 14, the rear wheels 21 are steered in the same phase relationship as the front wheels 8. However, when the steering angle is great and the crank arm 16a is rotated above the horizontal plane, the rear wheels 21 are steered in the opposite phase relationship relative to the front wheels 8.

According to this structure, the rotational angle of the crank member 16 relative to the steering angle of the steering wheel 1 can be freely selected, for instance by changing the gear ratio of the gear box 3, by changing the length of the crank arm 16a or by installing a speed reduction means in a suitable place in the path of transmission of the steering torque from the steering wheel 1 to the rear wheels 21, and a desired steering angle ratio between the front wheels and the rear wheel can thus be achieved both readily and freely.

Figure 2:
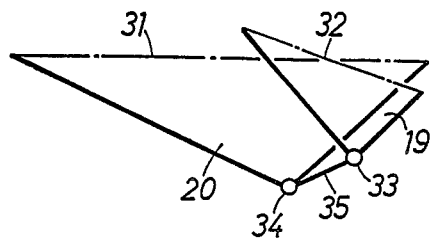
FIG. 2 shows a skeleton diagram of the suspension device of the present invention for one of the rear wheels in plan view.

FIG. 2 shows the geometric relationship between the upper and the lower control arm 19 and 20 in plan view or as projected onto a horizontal plane. The rotational axial line 31 of the the lower arm 20 relative to the vehicle body extends substantially parallel to the length of the vehicle body while the rotational axial line 32 of the upper arm 19 relative to the vehicle body extends obliquely so as to converge towards a longitudinal line which represents the length of the vehicle body in the forward direction.

Figure 3:
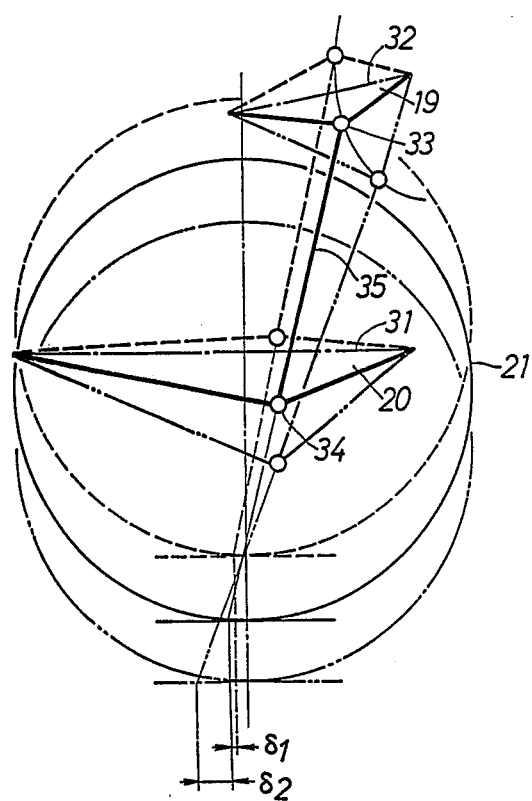
FIG. 3 shows a skeleton diagram of the suspension device of the present invention for one of the rear wheels in side view.

FIG. 3 shows the geometric relationship between the upper and the lower control arm 19 and 20 in side view or as projected on a vertical plane which extends parallel to the length of the vehicle body. The rotational axial line 31 of the lower arm 20 is substantially parallel to the length of the vehicle body while the rotational axial line 32 of the upper arm 19 extends obliquely so as to come closer to the road surface at its forward portion.

The axial line connecting the pivot points 33 and 34 between the knuckle 9 and the upper and the lower arm 19 and 20, respectively, defines an imaginary king pin axial line 35.

Because the rotational axial line 32 of the upper arm 19 slopes downwardly towards its front portion as shown in FIG. 3, the trajectory of the pivot point 33 between the knuckle 22 and the upper arm 19 has a relatively large longitudinal component while the motion of the pivot point 34 between the lower arm 20 and the knuckle 22 is limited to that which takes place along a vertical line. Furthermore, since the rotational axial line 32 of the upper arm 19 slopes inwardly towards its forward portion as shown in FIG. 2, the longitudinal displacement of the pivot point 33 is small when the distance between the wheel 21 and the vehicle body is small and is great when the distance between the wheel 21 and the vehicle body is great.

Figure 4:
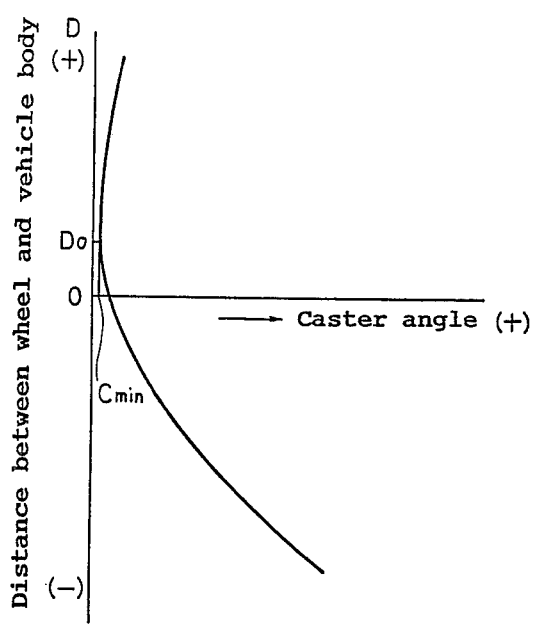
FIG. 4 is a graph showing the relationship of the caster angle, taken along the horizontal axis to the vertical relative displacement between the vehicle body and the rear wheel, taken along the vertical axis, the positive values of the relative displacement corresponding to different degrees of lifting of the vehicle body from its neutral position relative to the rear wheel while the negative values of the relative displacement correspond to different degrees of sinking of the vehicle body from its neutral position relative to the rear wheel.

Therefore, the change in the trail (delta 1) of the rear wheel 21 when the wheel has moved a certain distance from its neutral state (solid line) to a position (broken line) closer to the vehicle body is smaller than the change in the trail (delta 2) of the rear wheel 21 when the wheel has moved the same distance from its neutral state to a position (double dot chain line) away from the vehicle body. Thus, the trajectory of the pivot point 33 as seen from the side is elliptic. The curve representing the caster angle taken against the changes in the relative distance (D) between the wheel and the vehicle body as given in FIG. 4 is convex towards the origin of the coordinate system and takes a minimum value (Cmin) when the distance between the rear wheel and the vehicle body is slightly smaller than the corresponding distance in the neutral state (D=D0).

Figure 5:
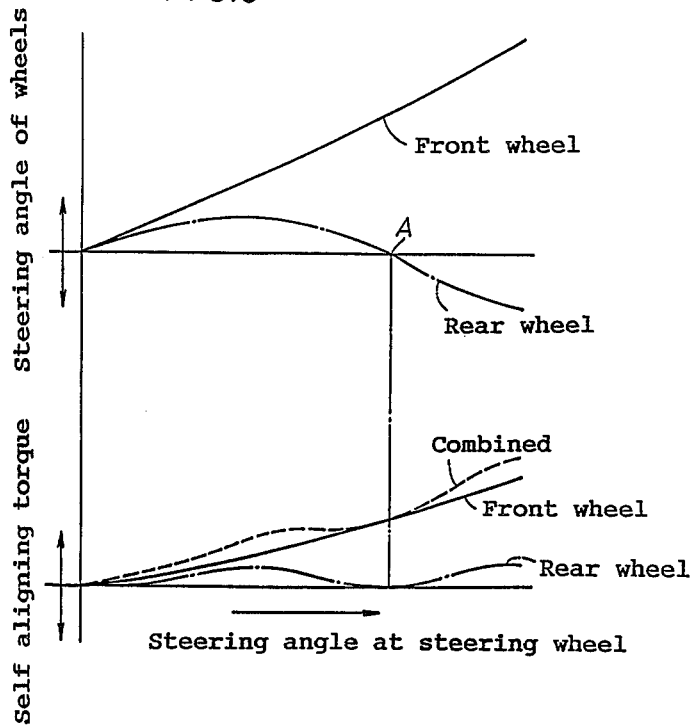
FIG. 5 is a conceptual graph showing the relationship between the steering angles of the front and the rear wheels and the self-aligning torques generated by the corresponding wheel sets.

The graph of FIG. 5 shows the changes in the steering torque as the steering angle is increased. The upper part of the graph shows the changes in the actual steering angles of the front wheels and the rear wheels against the increase in the steering angle as measured at the steering wheel. When the steering angle at the steering wheel is relatively small the rear wheels are steered in the same phase relationship relative to the front wheels, but when the steering angle at the steering wheels is increased beyond a certain angle indicated by A in the graph, the phase relationship of the steering angle of the rear wheels relative to the front wheels reverses. Thus, while the self-aligning torque of the front wheels increases substantially proportionally to the increase in the steering angle at the steering wheel over substantially the whole of the steering range, the self-aligning torque of the rear wheels initially increases with the steering angle at the steering wheel but diminishes as the steering angle of the rear wheels is reduced to the vicinity of the steering angle A at the steering wheel. Since the self-aligning torque of the rear wheels is relatively small under normal conditions as shown by the graph of FIG. 4, this change in the self-aligning torque produced by the rear wheels is masked by the self-aligning torque produced by the front wheels and the fluctuation in the steering torque can be controlled to stay at a level which the driver will not notice.

Furthermore, when the vehicle makes a sharp turn at a relatively high speed and the rear wheels are steered in the opposite phase relationship relative to the front wheels, the distance between the vehicle body and the outer rear wheel is reduced by the centrifugal force and the caster angle of the outer rear wheel is reduced (unless the turn is too sharp and the caster angle increases). Since the outer rear wheel which receives a greater vertical load than the inner rear wheel makes an accordingly greater contribution to the self-aligning torque of the rear wheels, the reduction in the caster angle of the outer rear wheel can effectively reduce the self aligning torque of the rear wheels and the fluctuation in the steering torque due to the changes in the self aligning torque can be made even less pronounced.

Furthermore, according to the present embodiment, when the rear part of the vehicle lifts as a result of sudden braking of the vehicle, since the caster trail is increased as a result, the points of contact between the rear wheels and the road surface move forward and the so-called anti lift action which pushes down the rear part of the vehicle is produced.

Although the present invention has been shown and described with reference to the preferred embodiment thereof, it should not be considered as limited thereby. Various possible modifications and alterations could be conceived of by one skilled in the art with respect to any particular embodiment without departing from the scope of the invention.

What we claim is:

1. A rear wheel suspension device for a front and rear wheel steering vehicle wherein rear wheels are steered in an opposite phase relationship relative to the front wheels at least under a certain condition, comprising:
   means for relatively sharply increasing the caster angle of each of the rear wheels as the distance between the vehicle body and the rear wheel is increased from a neutral state and for maintaining a smaller positive value as the distance between the vehicle body and the rear wheel is decreased from the neutral state.

2. A rear wheel suspension device as defined in claim 1, wherein a knuckle for each of the rear wheels is supported by an upper arm and a lower arm which pivotably connect the knuckle to the vehicle body at their respective two ends, respectively, and a rotational axial line of the upper arm inclines downward at its forward portion while the rotational axial line of the lower arm extends substantially parallel to the length of the vehicle.

3. A rear wheel suspension device as defined in claim 2, wherein the axial line of the upper arm additionally inclines inward at its forward portion.

4. A rear wheel suspension device as defined in claim 1, wherein the caster angle of the rear wheels assumes a positive minimum value when the distance between the rear wheel and the vehicle body is slightly decreased from the neutral state.

5. A rear wheel suspension device as defined in claim 1, wherein the rear wheels are steered in a same phase relationship when the steering angle of the front wheels is small and are steered in the opposite phase relationship when the steering angle of the front wheels is great.

* * * * *